United States Patent [19]
Waller

[11] 3,866,014
[45] Feb. 11, 1975

[54] METHOD OF WELDING LAMINATED CORES

[75] Inventor: Earl C. Waller, Redwood Township, Richland County, Wis.

[73] Assignee: Advance Transformer Co., Chicago, Ill.

[22] Filed: May 11, 1973

[21] Appl. No.: 359,373

[52] U.S. Cl. .................................. 219/137, 310/217
[51] Int. Cl. .......................... H02k 1/06, B23k 9/00
[58] Field of Search ............ 219/137; 310/216, 217; 29/483

[56] References Cited
UNITED STATES PATENTS

| | | | |
|---|---|---|---|
| 2,448,785 | 9/1948 | Dolan | 310/217 X |
| 2,783,404 | 2/1957 | Appenzeller | 310/217 |
| 2,790,918 | 4/1957 | Goran | 310/217 |
| 3,406,444 | 10/1968 | Parker et al. | 29/483 X |

Primary Examiner—C. L. Albritton
Assistant Examiner—Clifford C. Shaw
Attorney, Agent, or Firm—Silverman & Cass, Ltd.

[57] ABSTRACT

A method of welding laminated stacked cores of assembled electromagnetic devices which comprises initially stamping the core laminations so that the outer seams which will be produced on the lamination ends when the stacks are abutted has a central projection with a groove on opposite sides along the length of the seam, approximately half of the projection being formed on each part of the core. The electromagnetic device, fully assembled, is mounted in a jig with its core parts clamped together and is electrically connected to one terminal of the welding apparatus. The other terminal of the welding apparatus which carries the electrode is passed along the projection melting the projection and welding the core parts together on a fused joint that follows the seam.

10 Claims, 9 Drawing Figures

PATENTED FEB 1 1 1975  3,866,014
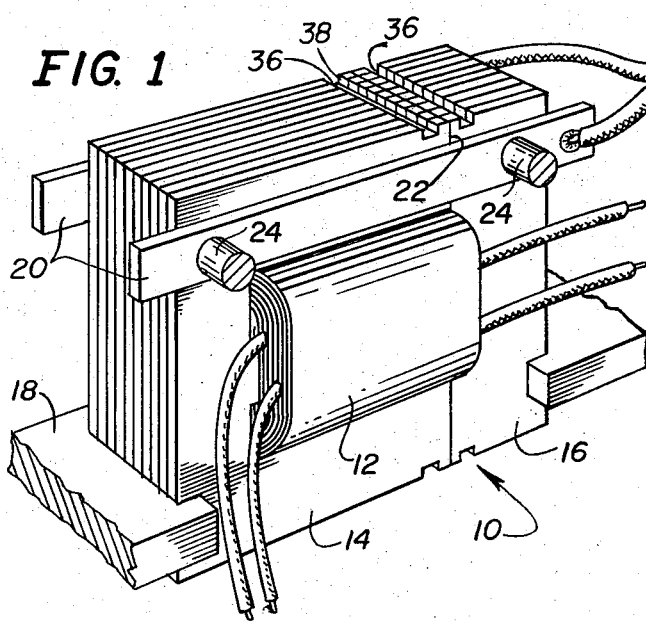
FIG. 1
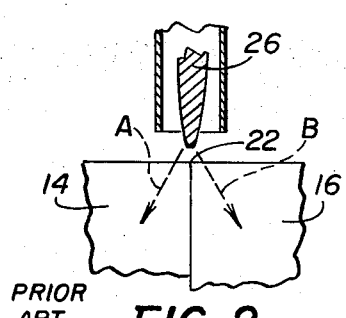
PRIOR ART  FIG. 2
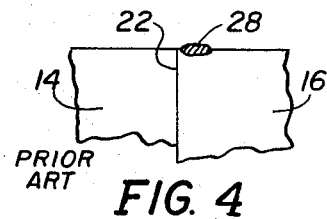
PRIOR ART  FIG. 4
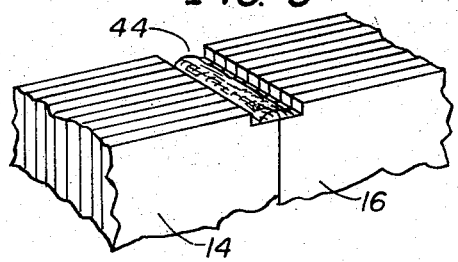
FIG. 9
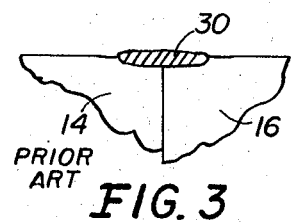
PRIOR ART  FIG. 3
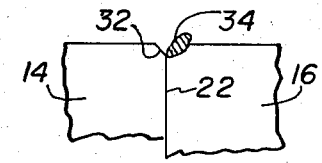
FIG. 5
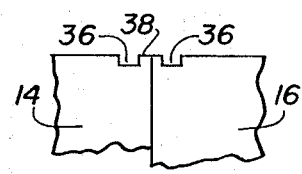
FIG. 6
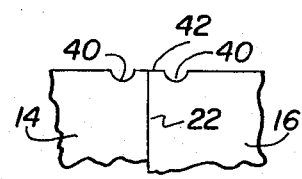
FIG. 7
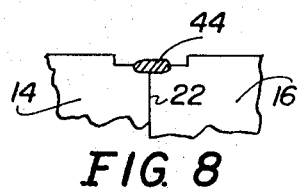
FIG. 8

METHOD OF WELDING LAMINATED CORES

BACKGROUND OF THE INVENTION

Electromagnetic devices made of laminated cores comprise coils of wire mounted on winding legs in the center of such cores. These coils must be surrounded on all sides by portions of the core and hence cores are normally formed of multiple parts held together. Of a necessity, there will be abutting planar faces of respective parts and it is important that the resulting connections be electrically and mechanically as similar in character to the remainder of the core as they can be made. Recent techniques utilize electric arc welding to form bridging welded joints in which the welding electrode is maintained in an atmosphere of helium, argon, nitrogen, $CO_2$ and the like. This technique will be generally referred to herein as heliarc welding.

Customarily, after the parts of the electromagnetic device have been made, they are assembled in a fixture which clamps the core parts together mechanically, this fixture being mounted in a welding apparatus that establishes contact with the core members away from the seams and the welding electrode is passed along the seams, being at the same time energized so that an electric arc is produced. The metal on both sides of each seam melts and flows together forming a fused or welded permanent joint at the outer ends of the abutted connection. Usually all seams are simultaneously welded by plural electrodes.

Electrical grade steel, especially with relatively large percentages of silicon such as, for example, two percent or more, is difficult to weld due to high resistance, brittleness and nonuniformity. The connections formed are located between abutted stacks of laminations, the edges of which have been produced by stamping so that uniformity and precise face to face abutment is not always assured. This, in spite of the fact that while assembled in the fixture and before welding the electromagnetic device is vigorously vibrated and strongly clamped together. The seam consequently is not always perfectly straight and of uniform abutment.

As a result of these deficiencies or perhaps for other reasons which are due to factors not investigated, welds of this type have two deficiencies which occur together or separately and often enough to cause problems. One effect is that the arc will wander one side or the other of the seam, probably due to preferential paths of lower resistances thereby not connecting all laminations. The second difficulty is that the welded joint becomes very wide.

If the weldment does not join all of the laminations, the electromagnetic device will buzz and may develop flaws in the flux pattern which in turn could adversely influence its electrical performance. When wandering of the arc becomes evident, the welded joints have to be rewelded which is expensive and time consuming and produces a wide weld. Wide welds have low resistance and tend to increase eddy currents so that the benefits of using electrical steel lamination are decreased.

The invention is intended to overcome the disadvantages.

For uniformity in the specification and claims, the following nomenclature will be used with the stated definitions irrespective of definitions in the prior art and literature:

A "seam" will mean the exterior visible line or gap which results when two stacks of laminations are abutted. It primarily refers to the actual line but includes so much of the facing surfaces of the abutting stacks immediately below the seam which influence the flow of electric current and which will be closed by weldment when the seam is welded.

A "joint" will mean that which results when a weld has been achieved. A joint will normally be made up of a line of weldment.

A "connection" as used herein will mean the engagement or area represented by the abutting faces of stacks of laminations held together. The seams are formed around the peripheries of connections. The outer seams which cross lamination ends are normally the ones which are welded to form joints and these occur on the sides of stacks which are usually normal to the plane of a connection. Such sides are called lateral herein.

Prior art in the techniques disclosed herein may be represented by the following U.S. patents:

| | | |
|---|---|---|
| 2,448,785 | L. M. DOLAN | Sept. 7, 1948 |
| 2,715,193 | D. C. STALEY | Aug. 9, 1955 |
| 2,783,404 | R. C. APPENZELLER | Feb. 26, 1957 |
| 2,790,918 | S. GORAN | Apr. 30, 1957 |
| 3,382,573 | J. MANTELET | May 14, 1968 |
| 3,406,444 | ANGUS R. PARKER | Oct. 22, 1968 |

SUMMARY OF THE INVENTION

According to the invention, laminations to be stacked and used in the production of an electromagnetic device are each provided with a notch on an outer lateral edge slightly spaced from the edge to be abutted in assembly of the core. When stacked the laminations will have a groove slightly spaced from the abutting surface. After the electromagnetic device is assembled the core parts are tightly abutted so that there is a projection along the seam with parallel notches on opposite sides of the projection. The welding circuit is established by one grounding electrode engaging the core away from the seam and the arc-producing electrode being passed along the seam immediately over the projection melting the projection and establishing a welded joint.

BRIEF DESCRIPTION OF THE DRAWINGS

FIG. 1 is a generally diagrammatic view of a simplified form of an electromagnetic device, used to explain the manner in which the method of the invention is carried out;

FIG. 2 is a fragmentary diagrammatic view showing the welding of a joint between abutted stacks of laminations, illustrating that the welding arc wanders;

FIG. 3 is a similar view showing a very wide weld;

FIG. 4 is a similar view showing a weld which has wandered and failed to join laminations;

FIG. 5 is a similar view showing a weld produced in a notch formed between lamination stacks;

FIG. 6 is a view showing abutted stacks of laminations which have been prepared for the method of the invention;

FIG. 7 is a view similar to that of FIG. 6 and showing an alternate form of preparation;

FIG. 8 is a view similar to that of FIG. 6 showing the completed weld; and

FIG. 9 is a perspective view showing a completed weld.

DESCRIPTION OF THE PREFERRED EMBODIMENTS

FIG. 1 shows a simple transformer 10 which is made up of a winding assembly 12 with multiple leads and two core parts 14 and 16. The core part 14 has an E shape and the core part 16 has an I shape. This simplified form is one of many used in the manufacture of transformers, chokes, and the like, the invention being applicable to any electromagnetic device in which there are core parts which must be connected together.

According to prior art, the coil assembly 12 would be mounted on the center leg of the E part 14 the I part 16 would be placed in position, the entire electromagnetic device 10 placed in a jig 18 which is indicated diagrammatically in the view, vibrated to straighten the stacks and clamped together. This fixture would then be placed in a suitable heliarc welding apparatus and copper bars such as indicated at 20 would be tightly pressed against surfaces or edges of the lamination parts 14 and 16 away from the seams 22. Pressure means are symbolically shown at 24.

Attention is now invited to FIGS. 2, 3, and 4 which illustrate the prior art. In FIG. 2 a plain seam 22 is shown formed between stacks 14 and 16. When the welding electrode 26 is brought to the seam 22, while it is intended that the arc be struck and maintained between the seam line and the electrode 26 it tends to wander either right or left as indicated by the broken lines A and B. In FIG. 4 it is shown that the weldment 28 is formed to the right of the junction 22 so that the laminations of the part 14 opposite the weldment are not connected to the laminations of the part 16.

In FIG. 3, the weld between parts 14 and 16 has been made very wide as shown at 30 either initially by welding slowly or because the welding had to be done a second time.

FIG. 5 illustrates an attempt to avoid the wandering of the arc. In this case, the original laminations are formed with half of a V-shaped notch on lamination along the edge to be welded thereby providing a V-shaped notch 32 when the seam 22 is formed. It has been found that the presence of the notch 32 does not prevent wandering of the arc so that often the weldment 34 will still form only on one or the other of parts 14 and 16.

In accordance with the invention and as shown in FIGS. 1, 6-9, when the laminations are stamped each is provided along its lateral edge adjacent to an edge which is to form a part of an abutting connection with a notch spaced from said latter edge. Thus the parts 14 and 16 will each have a small, narrow groove 36 spaced from the seam 22 by half of a projection formed between the grooves. The projection is designated 38. The notches may be as shown in FIG. 7 with rounded instead of squared bottoms so that the grooves 40 will be formed on opposite sides of a central projection 42.

If one studies FIGS. 2, 6, and 7, it is seen that by providing a central projection 38 which in effect is a free-standing spine, the distance required for the arcs A or B to move lateral of the seam 22 in air is substantially increased over the distances required for either of these arcs to move through air to the central projection 38 or 42. Accordingly, the arc prefers to pass through such central projections.

As the electrode 26 is passed along the projection or free-standing spine it melts the metal to form the weldment shown at 44, this being quite narrow and yet providing an excellent homogeneous central welded joint. Additionally, upon completion of the welding operation in the case of the structures formed by notching the weldment 44 is below the surface which is beneficial because there are no protrusions to catch or interfere with mounting, handling, expanding, and the like of the electromagnetic device.

The electromagnetic device may have more than two seams and the seams may all be welded simultaneously. Typical dimensions for grain-oriented electrical grade steel lamination stacks to be welded are: FIG. 6, notches 36 ⅛ inch wide and .04 inch deep with a total separation of .062 inch plus .062 inch; FIG. 7, notches 3/32 inch diameter semi-circles with centers each spaced .105 inch from the seam 22. The core was formed of E's and I's with a total overall dimension of about 1.7 × 2 inches and a stack height of about .52 inch formed of about 25 laminations.

Minor variations can be made in the method without departing from the spirit or scope of the invention as defined in the appended claims. For example, although it is preferred to form the notches in the individual laminations prior to assembly into stacks, core parts could be milled after stacking and before assembly. Likewise, instead of forming the projections 38 or 42 by notching, these could be protuberances on the lamination edges. Of course, the amount of waste generated would increase but the effect achieved primarily would be as described.

What it is desired to secure by Letters Patent of the United States is:

1. A method of welding laminated cores of electromagnetic devices in which there are at least two core parts each formed of a separate stack of laminations, such parts having abutting faces forming interior connections having exterior seams, said method comprising stamping the laminations forming such parts with respective notches on opposite lateral edges, such notches each being spaced from the edge of the lamination which is to form a portion of an abutting face whereby to provide, when the laminations are stacked to form said parts, approximately half of a central projection with a contiguous parallel groove on each part at the edges to be abutted, assembling the laminated core by bringing the stacks into engagement with their opposed faces abutted to form a common connection and the part projections joining to form a full projection, the seams being located in the projection and joining after assembly to form a common seam, holding the electromagnetic device in assembly while connected to the ground terminal of welding apparatus, and passing the welding electrode of the welding apparatus along the common projection to cause the electric arc to pass through the projection closing the common seam with weldment.

2. The method as claimed in claim 1 in which the notches are generally rectangular.

3. The method as claimed in claim 1 in which the notches are generally semicircular.

4. In a method for connecting two stacks of laminations together in edge abutting relationship along a seam between the two stacks to form an electromagnetically unitary structure and which includes assembling individual laminations into two stacks, said stacks not necessarily having the same configuration but all laminations in a stack being of substantially the same configuration, each lamination having a corner defined by the juncture of one outer lamination edge and one inner lamination edge, all of the aligned outer lamination edges of each stack forming an outer edge face of said stack and all of the aligned inner lamination edges of each stack forming an inner edge face of said stack, the lamination corners of each stack defining a stack corner, bringing an inner edge face of one stack into abutting engagement with the inner edge face of the other stack and with the stack corners juxtaposed to form said seam, and passing an electrical welding arc along said seam in close proximity thereto while tightly maintaining said abutting engagement, the invention herein which comprises:

forming a notch at substantially the same location in the outer edge of each lamination spaced slightly from its corner with the notches of the laminations in each stack aligned so as to provide a groove in the outer stack edge face parallel to its stack corner and thereby forming a partial projection extending transversely of the stack at its inner edge face, whereby when the stacks are in abutting engagement the partial projections form a full projection with the seam defined between them so that the welding arc passes along the top of the projection.

5. The method as claimed in claim 4 in which the groove and part projection of each stack are formed by providing a notch in each lamination prior to stacking.

6. The method as claimed in claim 4 in which the groove and part projection of each stack are formed after the laminations are stacked.

7. The method as claimed in claim 6 in which each groove is generally rectangular.

8. The method as claimed in claim 6 in which each groove is generally semicircular.

9. The method as claimed in claim 5 in which each groove is generally rectangular.

10. The method as claimed in claim 5 in which each groove is generally semicircular.

* * * * *